(12) United States Patent
Nelson et al.

(10) Patent No.: US 6,515,971 B2
(45) Date of Patent: Feb. 4, 2003

(54) METHOD AND APPARATUS TO ENABLE BACKGROUND SCANNING

(75) Inventors: Leonard E. Nelson, Boynton Beach, FL (US); Douglas I. Ayerst, Delray Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 64 days.

(21) Appl. No.: 09/737,708

(22) Filed: Dec. 15, 2000

(65) Prior Publication Data

US 2002/0110093 A1 Aug. 15, 2002

(51) Int. Cl.$^7$ .................................................. H04Q 7/14
(52) U.S. Cl. ........................ 370/314; 370/330; 340/7.42
(58) Field of Search ............................... 340/7.42, 7.2, 340/7.25, 7.27; 370/330, 329, 314; 455/434

(56) References Cited

U.S. PATENT DOCUMENTS

| | | | |
|---|---|---|---|
| 4,914,649 A | | 4/1990 | Schwendeman et al. |
| 5,652,752 A | * | 7/1997 | Suzuki et al. ................ 370/330 |
| 5,682,147 A | * | 10/1997 | Eaton et al. ................ 340/7.27 |
| 5,740,533 A | * | 4/1998 | Lin ............................ 340/7.42 |
| 5,878,035 A | * | 3/1999 | Wang et al. ................. 370/329 |
| 6,141,535 A | * | 10/2000 | Ayerst ......................... 340/7.25 |

* cited by examiner

*Primary Examiner*—Edwin C. Holloway, III
(74) *Attorney, Agent, or Firm*—Philip P. Macnak; Daniel C. Crilly

(57) ABSTRACT

A method is provided for background scanning in a selective call communication system (102) having a plurality of channels (110, 112, 114), wherein a selective call device (104) has designated thereto one of an odd and even frame compulsory decoding schedule. The selective call device (104) decodes system configuration information (SCI) on odd SCI frames during the odd compulsory decoding schedule, scans for even SCI frames of target channels while maintaining the odd compulsory decoding schedule, and releases or maintains the odd compulsory decoding schedule based on the system configuration information found on the target channels.

6 Claims, 5 Drawing Sheets

METHOD AND APPARATUS TO ENABLE BACKGROUND SCANNING

BACKGROUND OF THE INVENTION

1. Field of the Invention

This invention relates in general to communication devices which can scan multiple frequency channels, and more specifically to communication devices which utilize background scanning to scan the multiple frequency channels.

2. Description of the Related Art

Communication devices, such as one-way receiving devices, and two-way transceivers have been utilized in a variety of communication systems which often require the communication device to operate on multiple frequency channels as the communication devices move from one geographic area to another. U.S. Pat. No. 5,923,266 issued Jul. 13, 1999 to Wang, et al., entitled "Method for Dynamically Changing Control Frames for Selective Call Receiving Devices" describes the operation of such a prior art two-way communication device which can dynamically scan multiple frequency channels.

As the number of communication devices within a given geographic area increase, there is a need to control the transmission of information to smaller transmission areas to increase the number of communication devices that can send or receive messages within the communication system. Because the communication device in such systems can receive transmissions generated by multiple transmitters, there is a need for the communication device to be capable of receiving transmissions not only on the channel on which the communication device is currently registered, but also on alternate frequency channels utilizing background scanning to identify alternate transmitters which are providing stronger or higher priority signals operating on different frequency channels.

DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DETAILED DESCRIPTION OF THE INVENTION

Figure 1:
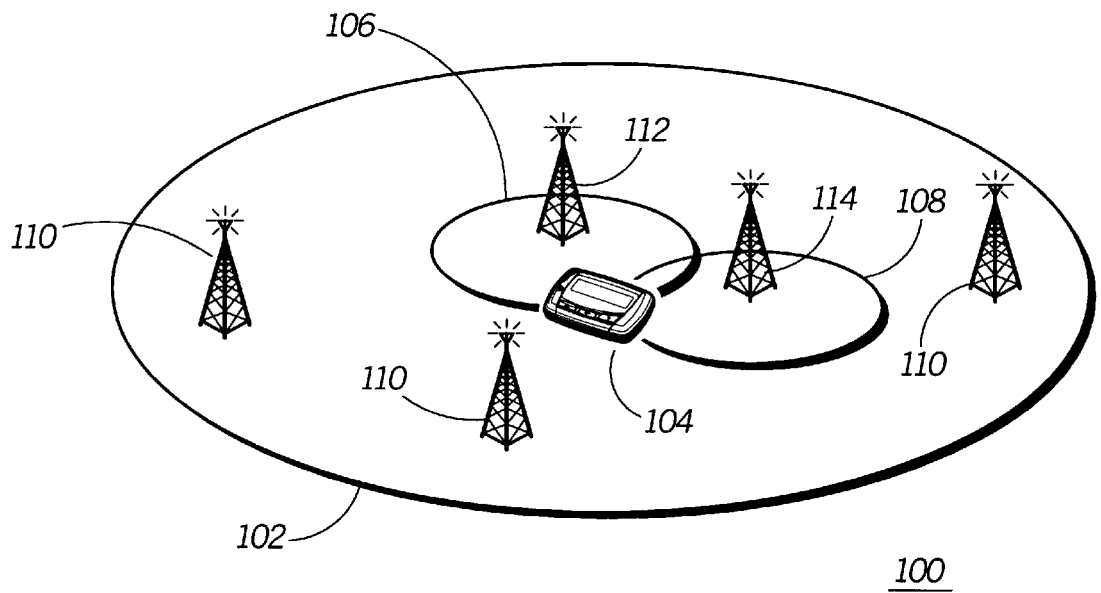
FIG. 1 is a diagram of a communication system in accordance with the present invention.

The present invention is best understood by reference to a conventional signaling protocol, such as the ReFLEX™ signaling protocol to be described below, which is used to provide two-way communication between a communication device, such as a ReFLEX™ subscriber unit, hereinafter referred to as subscriber unit 104, and a communication system 100, shown by way of example in FIG. 1. The communication system 100 encompasses a wide geographical area 102 operating on a first frequency channel 110 within which smaller geographical areas, or sub-zones, 106, 108 exist which can provide localized transmission on alternate frequency channels 112, 114. Coverage within the wide geographic area is provided by multiple transmitters operating on the first frequency channel. Wide area coverage is generally provided by simulcasting the information to be transmitted in a manner well known to one of ordinary skill in the art. Coverage within the smaller geographic areas is provided by one or more transmitters operating on the alternate frequency channels and can be accomplished by way of a single transmitter or a number of transmitters also simulcasting the information. It will be appreciated that coverage to the wide geographic area can also be provided by a single high power transmitter, while coverage to each of the smaller geographic areas can also be provided by a single low power transmitter. It will also be appreciated that the coverage areas provided in the smaller geographic areas need not overlap with other coverage areas.

The standard ReFLEX™ subscriber unit receives and decodes only a single ReFLEX™ channel at a time. Once the subscriber unit 104 is registered with the communication system 102 on channel 110, the subscriber unit 104 must decode all compulsory frames on channel 110 in anticipation of receiving a message. In the instance the subscriber unit 104 is registered on one of the sub-zones 106, 108, on channels 112, 114 respectively, the subscriber unit 104 must decode all compulsory frames on the channel associated with the sub-zone in which it is registered in anticipation of receiving a message.

The subscriber unit 104 can occasionally register on a sub-zone that provides a weak signal due to there being a substantial distance between the subscriber device 104 and the transmitter, or the subscriber unit 104 can occaisionally register on a sub-zone having a lower priority ranking. In such cases, it is desirable for the subscriber unit 104 to search for and register for service with another sub-zone which would provide a stronger signal or provide a higher priority when a channel of such a sub-zone becomes available. This search must be done without missing messages that can be delivered within the current zone or sub-zone within which the subscriber unit 104 is registered.

Figure 2:
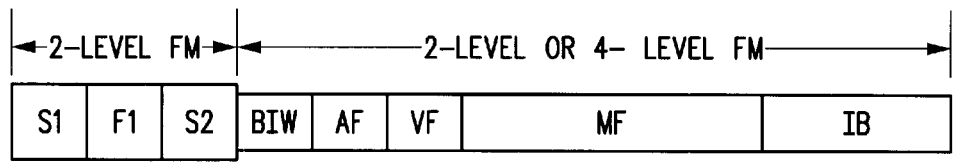
FIG. 2 is a diagram illustrating a signaling protocol suitable for use by a communication device in accordance with the present invention.

The ReFLEX™ signaling protocol utilizes 128 frames per cycle in a 4 minute period wherein the frames are numbered from 0 to 127. Each of these frames has the field order shown in FIG. 2 wherein S1 is a first synchronization pattern followed by a frame information word F1 which is in turn followed by a second synchronization word S2. Thereafter, one or more block information words BIW are followed by an address field AF, vector field VF, message field MF and idle blocks IB.

The present invention enables a ReFLEX™ subscriber unit to background scan (BGS) for more preferred channels (sub-zones) without missing messages that may be transmitted within the zone or sub-zone in which the subscriber unit is currently registered. The present invention allows every frame of the paging/control channel to be used for addressing (and messaging) the population of subscriber units so that channel efficiency can be maximized.

Figure 3:
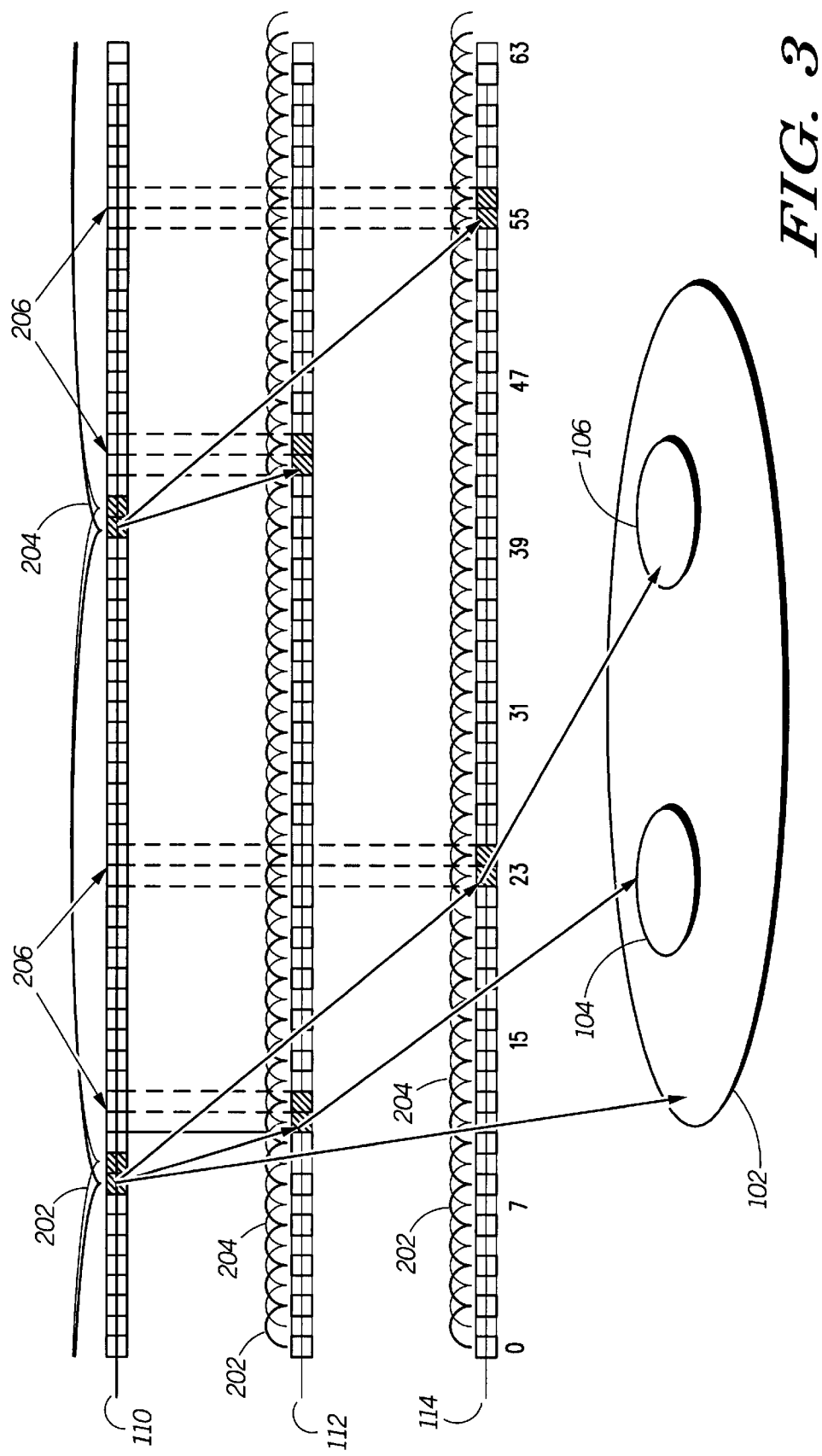
FIG. 3 is a diagram illustrating a scanning method utilized by the communication device in accordance with the present invention.

FIG. 3 illustrates the method by which background scanning is performed in accordance with the present invention. When a subscriber unit 104 enters a new geographical area, or is turned on after being turned off in the current geographical area, the subscriber unit 104 tunes to a first frequency 110 which is defined by information stored within the subscriber device code plug in a manner well known to one of ordinary skill in the art. In the example shown, the subscriber unit 104 first decodes the SCI (system configuration information) for Zone 1 which can be transmitted in any of the SCI frames. The SCI is designated within the block information word (BIW) of those frames, and whereupon after receiving the SCI, the subscriber unit 104 will register with the communication system 100 within Zone 1.

A subscriber unit 104 which is currently registered in Zone 1 will periodically attempt to decode SCIs on those channels listed in the "local scan list" provided within the block information words (BIW) for the subscriber unit's registered zone, in this instance the channels listed in the "local scan list" would include at least channels 112, 114.

Unlike prior art subscriber units, the subscriber unit 104 in accordance with the present invention will attempt to decode either the even or the odd numbered SCIs on the other channels operating within the current geographic area depending upon the subscriber unit's compulsory decoding schedule for the channel on which the subscriber unit 104 is operating. Thus, when the compulsory decoding schedule for subscriber unit 104 requires scanning even compulsory frames on the current channel, subscriber unit 104 would then attempt to detect and decode the odd numbered SCI on the alternate channels, and vice-versa. When a higher priority SCI is detected, or when the received signal strength of a current zone is inadequate and another zone's SCI can be decoded with adequate signal strength being received, the subscriber device 104 will register within the new zone.

Figure 4:
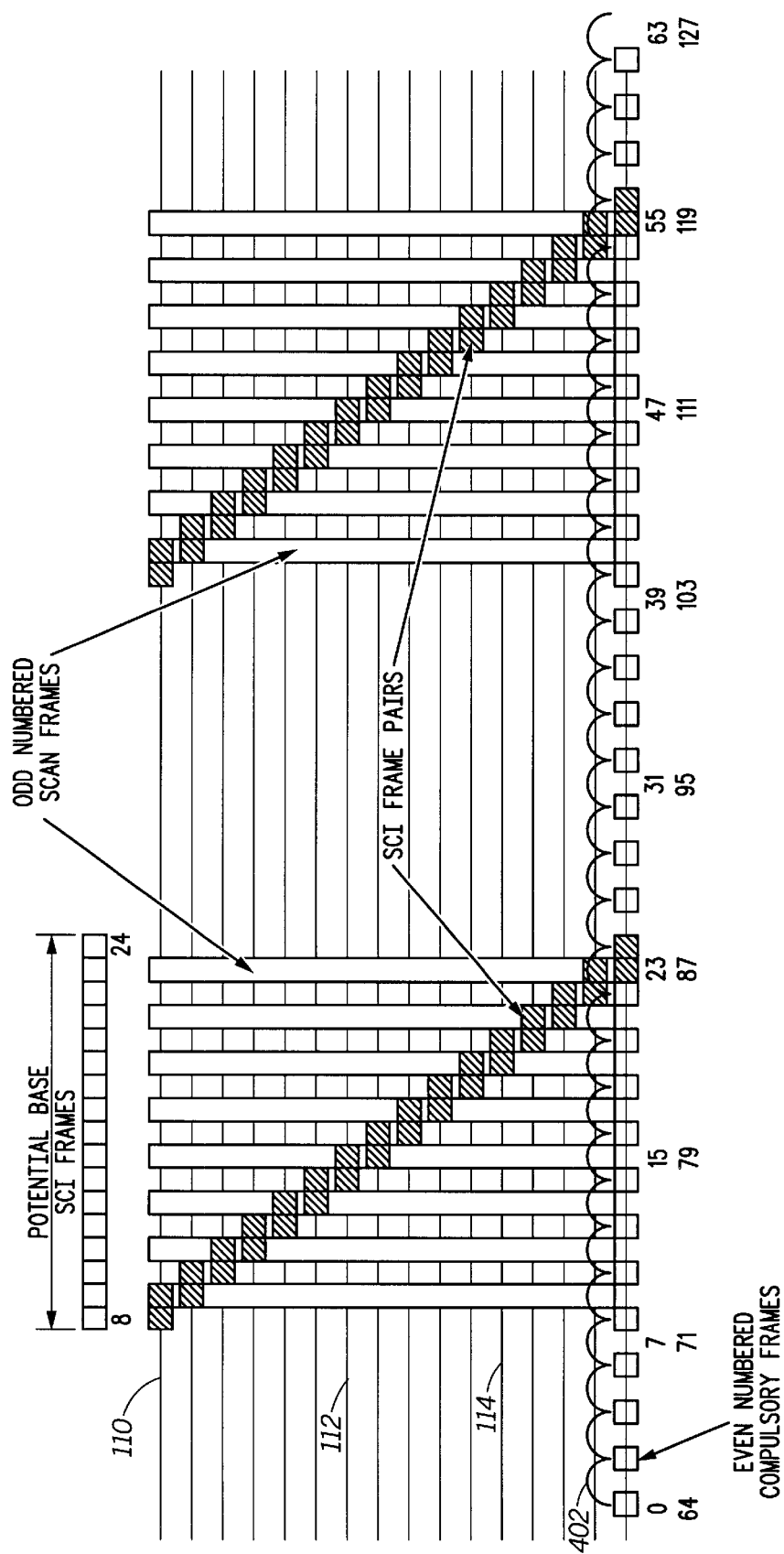
FIG. 4 is a diagram further illustrating the scanning method utilized by the communication device in accordance with the present invention.

FIG. 4 illustrates a possible arrangement of SCI pairs for a region in which sixteen transmission zones are available by way of example. As shown, the even and odd SCI frame locations have a range [8–24] are communicated to the subscriber unit 104 BIWs. The number of SCI frame locations is determined by the number of channels that are available within a given geographical area. Thus if only eight channels were available, the potential SCI frame locations would be defined in the BIWs haing a range [8–16]. The even compulsory decoding schedule 402 for a subscriber unit 104 is shown. When the subscriber unit 104 is performing background scanning in an attempt to detect a better channel, i.e. a channel providing a better signal strength or a higher priority, the subscriber unit would scan the alternate channels during the odd SCI frames of the SCI frame pairs.

Figure 5:
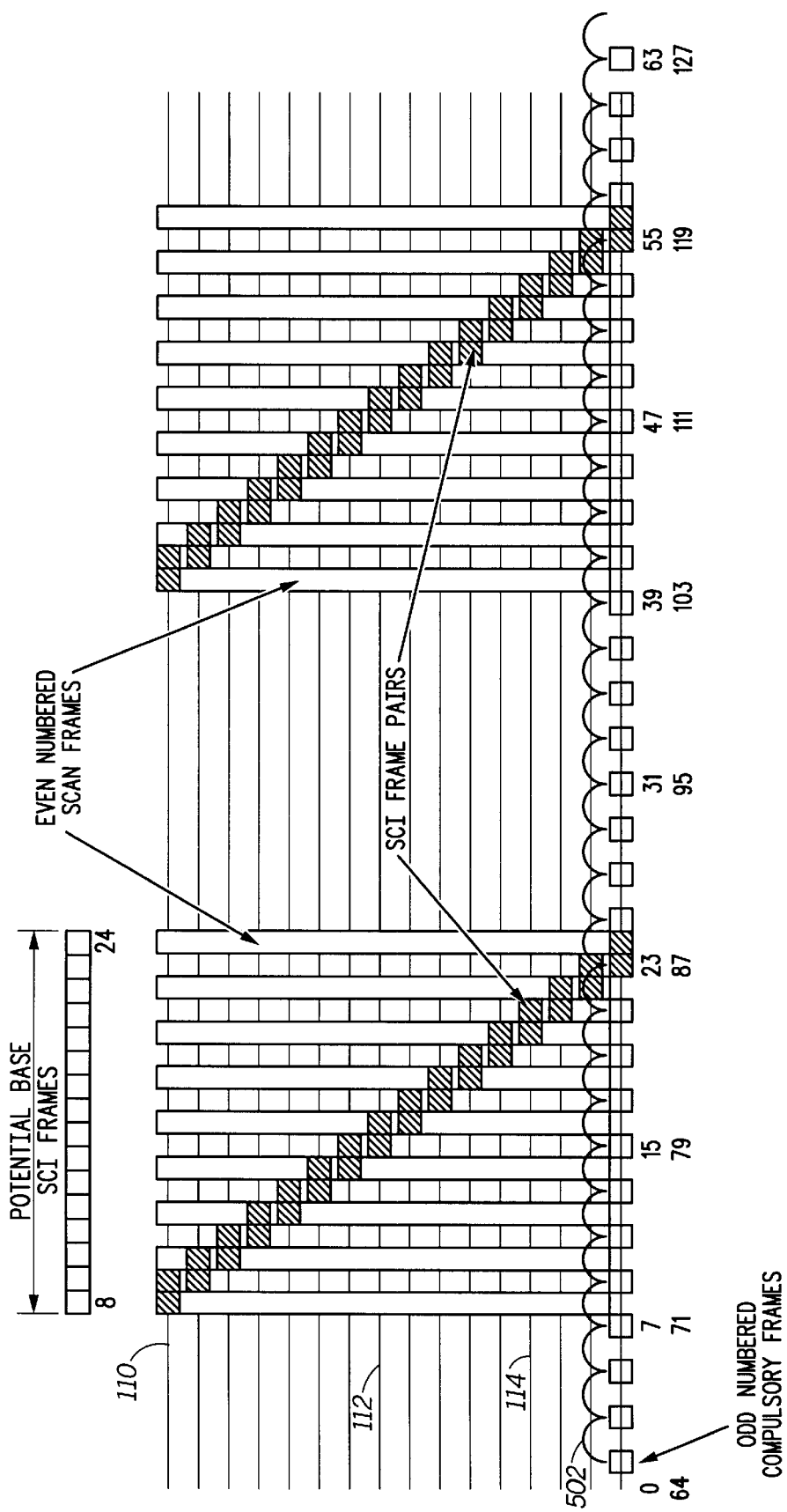
FIG. 5 is a diagram illustrating an alternate communication device scanning method in accordance with the present invention.

FIG. 5 illustrates the arrangement of SCI pairs in which the subscriber device is assigned to the odd numbered compulsory frames. The odd compulsory decoding schedule 502 for a subscriber unit 104 is shown. When the subscriber unit 104 is performing background scanning in an attempt to detect a better channel, i.e. a channel providing a better signal strength or a higher priority, the subscriber unit would scan the alternate channels during the even SCI frames of the SCI frame pairs.

Figure 6:
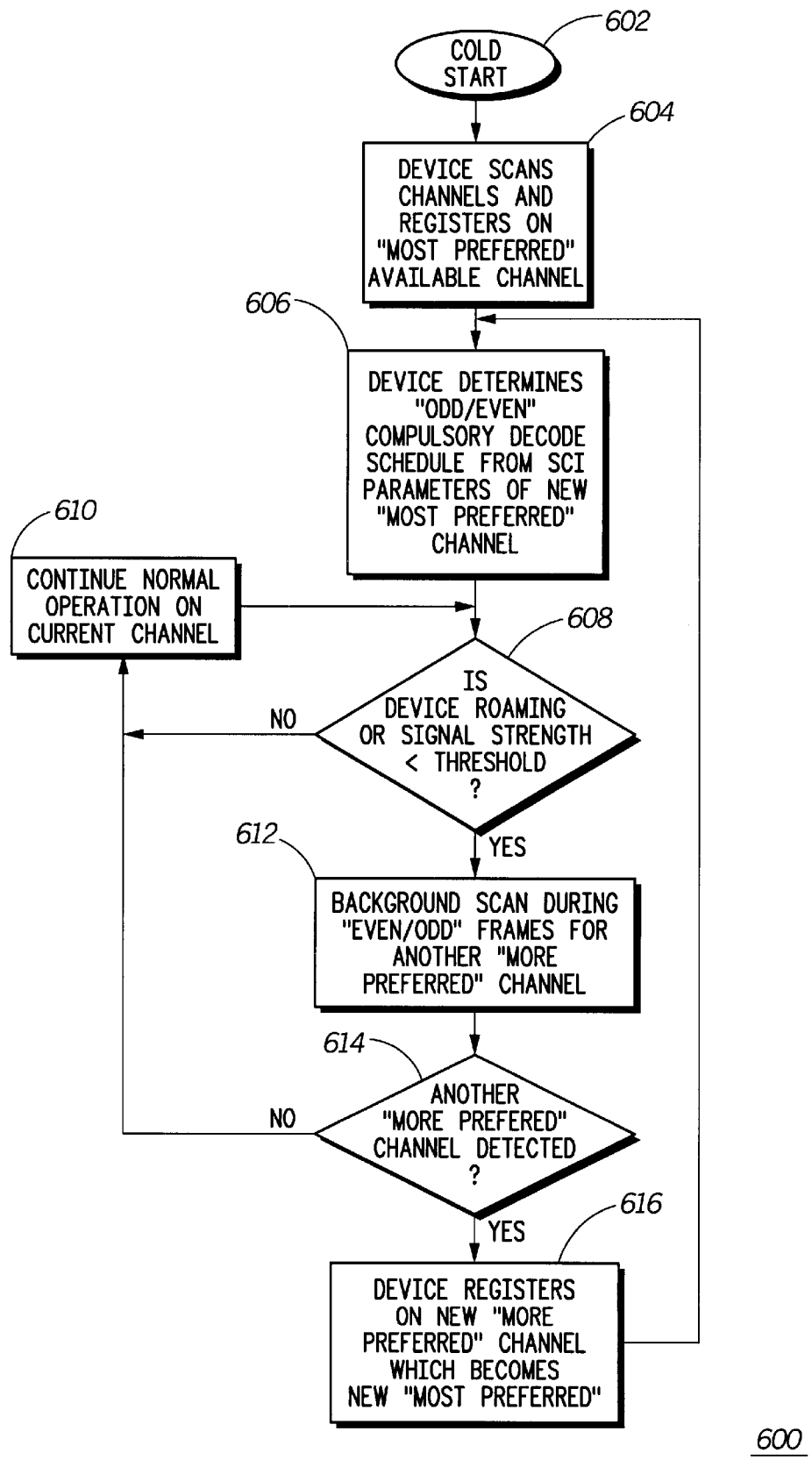
FIG. 6 is a flow chart illustrating the communication device scanning method in accordance with the present invention.

FIG. 6 is a flow chart 600 illustrating the background scanning in accordance with the present invention. When the subscriber device 104 is first turned on, or first becomes aware of transmissions in a new geographical area, at step 602, the subscriber unit 104 scans the channels and registers on the most preferred channel available, at step 604. The most preferred channel is one which the signal strength is greatest or is recognized to be a "home" channel, i.e. the subscriber device 104 seeks a "home" channel over a "roaming" channel. The subscriber device 104, at step 606, determines whether the odd compulsory decoding schedule, or the even compulsory decoding schedule is to be followed for the new most preferred channel it has selected from the SCI parameters obtained from the BIWs. When the subscriber device is not roaming or when the received signal strength is above a predetermined threshold, at step 608, the subscriber device continues normal operation on the current channel, at step 610. When the subscriber device is roaming or when the received signal strength is below a predetermined threshold, at step 608, the subscriber device background scans during the even frames when the odd frame compulsory decoding schedule is active, or during the odd frames when the even frame compulsory decoding schedule is active, to identify another more preferred channel, at step 612. When another more preferred channel is not detected at step 614, the subscriber device continues operation of the current channel, at step 610. When another more preferred channel is detected at step 614, the subscriber device registers on the new more preferred channel, which then becomes the new most preferred channel, at step 616, after which operation returns to step 606, as described above.

In the context of the description provided above, it will be appreciated that the term background scanning refers to the process by which a subscriber device searches for other more preferred sub-zones that may be present within the current geographical area. The determination is by detecting the presence of other channels operating within the current geographical area without interruption to receiving message information within the zone or sub-zone to which the subscriber device 104 is registered. The term SCI frames refers to those frames that carry System Configuration Information as defined in the ReFLEX signaling protocol. The subscriber device stores within a code plug a master scan list which provides a list of frequencies and associated SPIDs (Service Provider Identifiers) or SCIDs (Scan Identifiers). The master scan list is used by the subscriber device to locate a channel within the geographical area in which the device is located during cold start initialization. The subscriber device also stores a local scan list which is a list of frequencies and associated SCI frame numbers obtained from the local scan list BIWs that are contained within the SCI frames for the current sub-zone in which the subscriber device is registered. Global scanning refers to scanning performed by the subscriber unit which is directed from information stored in the master scan list. Local scanning refers to scanning performed by the subscriber unit which is directed from information stored in the local scan list. A preferred sub-zone is a sub-zone that is preferable over another sub-zone because the sub-zone has either a higher priority or provides a higher quality signal.

Background scanning is a means by which a subscriber device 104 determines if a more preferable sub-zone is detectable, while still maintaining the decoding of messages on the current channel to which the subscriber device 104 is registered. Background scanning in accordance with the present invention requires the subscriber device 104 to switch from the channel it is registered on and currently receiving to an alternate channel during the scheduled transmission of SCI frame pairs (two consecutive SCI frames transmitted in a sequence). The SCI frame pairs enable subscriber devices that decode even compulsory frame decoding schedules to scan for odd SCI frames, and subscriber devices that decode odd compulsory frame decoding schedules to scan for even SCI frames. The local scan list is determined from the BIWs received on the current registered channel, the BIWs reference the SCI frames of the target channel to be scanned.

The System Configuration (SCI) frame BIW is shown below.

| LSB | | | | | | | | | Bit Position | | | | | | | | | | | MSB |
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 |
| 0 | 0 | 1 | 0 | 0 | sc0 | sc1 | sc2 | sf0 | sf1 | sf2 | sf3 | sf4 | sf5 | sf6 | fc0 | fc1 | fc2 | PR | r | r |

The BIW specifies the SCI base frame location and the SCI collapse mask applicable to the current channel and current sub-zone. Channels that have the "c" bit set in the frame information word must have SCI frames. The bit definitions are as follows:

Sc System Configuration Information collapse mask [0, 5]. System Configuration Information frames must appear spaced by $2^{sc}$ frames (1 to 32 frames for sc=0 to 5) with the SCI base frame as the 'anchor' frame.

sf Frame number of the System Configuration Information base frame in each cycle. The frame numbers of all SCI frames in a cycle are referenced to the SCI base frame. Note: SCI frames in this discussion are SCI frames that are applicable to the same sub-zone.

fc The logical channel number of this channel [0, 7]. The subscriber unit can use the forward channel assignment number, s, referenced by the logical channel number (fc) in conjunction with the forward channel base frequency, and the frequency spacing, to calculate the absolute frequency of the channel. This can be used to check that the unit is tuned to the correct channel.

PR SCI Frame Pair indicator [0, 1], on control channel.

PR=0 indicates that SCI frame pairs are not transmitted.

PR=1 indicates that SCI frame pairs are transmitted.

The following two BIWs are used to specify forward channel numbers and transmission frequencies and SCI frame locations for the local scan list.

In summary, a method for background scanning in a selective call communication system 100 having a plurality of channels 110, 112, 114 is described above. The selective call device 104, previously referred to as the subscriber unit 104, has designated one of an odd or even frame compulsory decoding schedule. The selective call device 104 decodes system configuration information (SCI) on odd SCI frames of the registered channel when it is following an odd compulsory decoding schedule, and scans for even SCI frames on other channels while maintaining the odd compulsory decoding schedule. The selective call device 104 releases or maintains the odd compulsory decoding schedule based on the system configuration information found on the even SCI frames of other channels.

The selective call device 104 further decodes system configuration information on even SCI frames of the registered channel when it is following an even compulsory decoding schedule, and scans odd SCI frames on the other channels while maintaining the even compulsory decoding schedule. The selective call device releases or maintains the even compulsory decoding schedule based on the system configuration information found on the odd SCI frames of other channels.

A method of selecting a system configuration information (SCI) frame while a selective call device 104 is operating within a current registered zone and where the SCI frames occur in adjacent sequential pairs of frames within a plurality of frames is described above. The selective call device 104 determines when a SCI frame pair is indicated on a current zone, and when no SCI frame pair is indicated, the selective call device uses a SCI base frame designated in a compulsory decoding schedule that determines the SCI base frame number, otherwise, the SCI frame pair indicated on the current zone is provided in the SCI frame's BIW. The selective call device selects even or odd SCI frames to decode based on the compulsory decoding schedule, aligns the SCI base frame used by the selective call device with a base frame for the selective call device such that the SCI

| LSB | | | | | | | | | Bit Position | | | | | | | | | | | MSB |
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 |
| 1 | 1 | 1 | 1 | 0 | cn0 | cn1 | cn2 | cn3 | r | PR | sc0 | sc1 | sc2 | sf0 | sf1 | sf2 | sf3 | sf4 | sf5 | sf6 |
| 0 | 0 | 0 | 0 | 1 | cn0 | cn1 | cn2 | cn3 | CS | s0 | s1 | s2 | s3 | s4 | s5 | s6 | s7 | s8 | s9 | s10 | cn Local Scanning Channel Number [0, 15].
S Forward channel assignment number [0, 2047], used to specify the center frequency of the channel designated by 'cn'.
CS Channel Spacing indicator [0, 1].
CS = 0 indicates default channel spacing and frequency calculation is used.
CS = 1 indicates 10 kHz channel spacing and frequency calculation is used.
Sc SCI frame collapse mask [0, 7], on channel 'cn'.
sf Frame number of the first SCI base frame [0, 127], of the SCI base frame pair on channel 'cn'.
PR SCI Frame Pair indicator [0, 1], on channel 'cn'.
PR = 0 indicates that SCI frame pairs are not transmitted on channel 'cn'.
PR = 1 indicates that SCI frame pairs are transmitted on channel 'cn'.

base frame and the compulsory decoding schedule are both even or both odd. The selection of SCI frames is based on the selective call device's address, base frame management parameters, and SCI frame BIW parameters.

A method of selecting a scan frame for a channel found in a local scan list and where the SCI frames occur in adjacent sequential pairs of frames within a plurality of frames is described above. The selective call device 104 decodes a set of block information words (BIWs) for a local scan list sent on a selective call device's current registered sub-zone, and determines when a SCI frame pair is indicated on a target zone. When no SCI frame pair is indicated, the selective call device uses a SCI base frame found in a compulsory decoding schedule of the target zone that determines the SCI base frame number, otherwise, the SCI frame pairs are indicated on the target zone and are provided in the local scan list BIWs. The selective call device selects one of even or odd target SCI frames to decode based on the compulsory decoding schedule of the current channel and arranges the SCI frames used by the selective call device 104 to scan the target channel such that the SCI frames of the current channel and the SCI frames of the target channel are not both even or both odd.

While specific embodiments of this invention have been shown and described, further modifications and improvements will occur to those skilled in the art. All modifications which retain the basic underlying principles disclosed and claimed herein are with the scope and spirit of the present invention.

We claim:

1. A method for background scanning in a selective call communication system having a plurality of channels, each of the plurality of channels being divided into a plurality of frames, the plurality of frames including a group of frames arranged into SCI frame pairs in which system configuration information (SCI) is communicated, and wherein a selective call device has been designated a compulsory decoding schedule for decoding system configuration information present in the SCI frame pairs, the method comprising the steps of:

decoding system configuration information during one SCI frame of an SCI frame pair in accordance with the designated compulsory decoding schedule;

scanning, during the other SCI frame of the SCI frame pair, for system configuration information on a target channel while maintaining the designated compulsory decoding schedule; and releasing or maintaining the designated compulsory decoding schedule based on the system configuration information found on the target channel.

2. The method of claim 1, wherein the step of scanning further comprises the step of determining if an SCI frame is indicated on the target channel.

3. The method of claim 1, wherein the designated compulsory decoding schedule is an even compulsory decoding schedule, wherein the step of decoding is performed during an even SCI frame of the SCI frame pair, and wherein the step of scanning is performed during an odd SCI frame of the SCI frame pair.

4. A method of selecting a system configuration information (SCI) frame while a selective call device is registered in a zone, the method comprising the steps of:

determining whether an SCI frame pair is indicated on a channel in the zone;

when no SCI frame pair is indicated, using an SCI base frame designated in a compulsory decoding schedule; and aligning SCI frames with frames of the compulsory decoding schedule;

when an SCI frame pair is indicated, selecting one SCI frame of the SCI frame pair to decode based on the compulsory decoding schedule; and scanning, during the other SCI frame of the SCI frame pair, for system configuration information on a target channel while maintaining the compulsory decoding schedule.

5. The method of claim 4, wherein the step of selecting one SCI frame of the SCI frame pair comprises the step of using at least one of the selective call device's address, base frame management parameters, and SCI frame block information word parameters.

6. The method of claim 1, wherein the designated compulsory decoding schedule is an odd compulsory decoding schedule, wherein the step of decoding is performed during an odd SCI frame of the SCI frame pair, and wherein the step of scanning is performed during an even SCI frame of the SCI frame pair.

* * * * *